P. F. McAVINNEY.
ELECTROMECHANICAL CONTROLLER.
APPLICATION FILED DEC. 21, 1910.

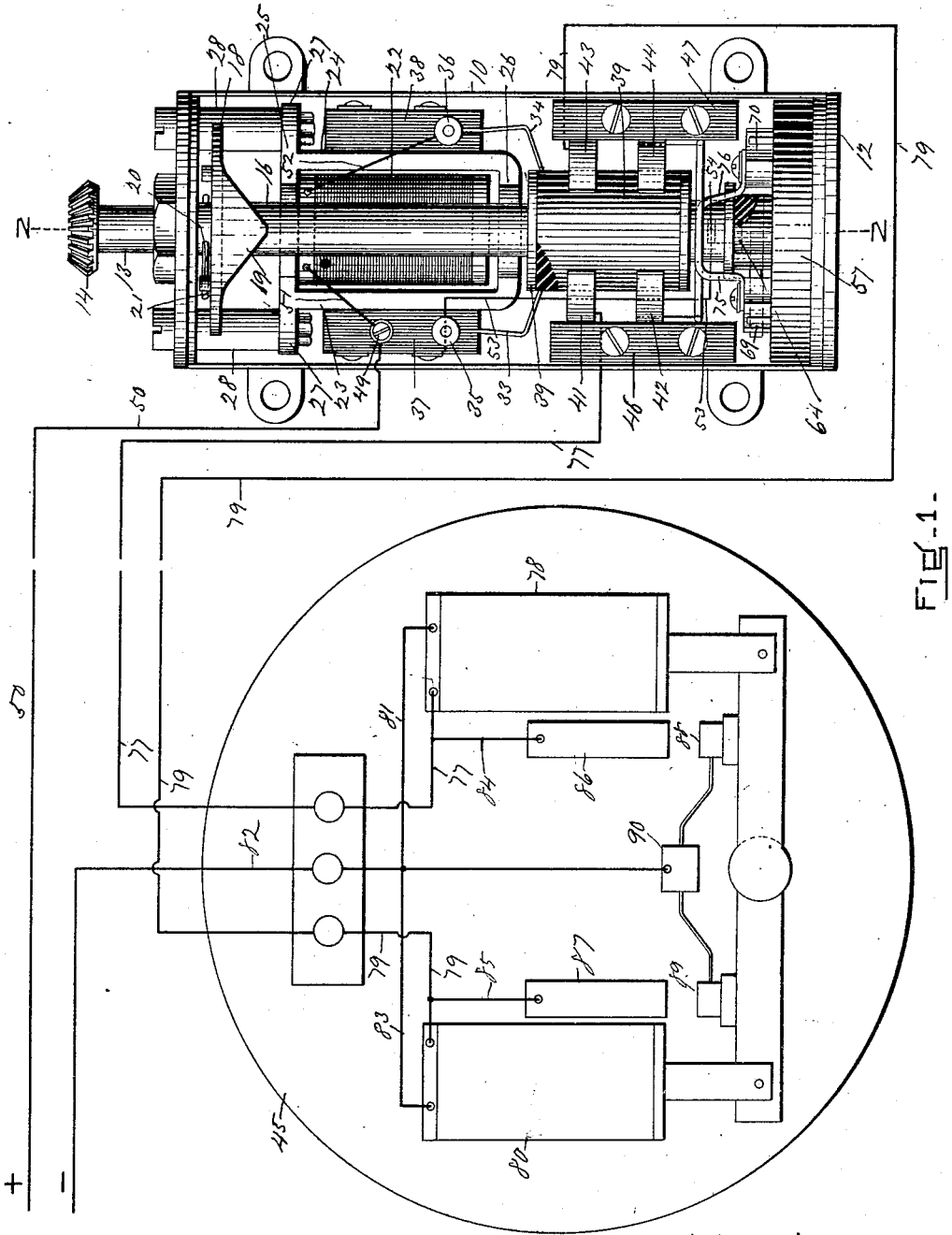

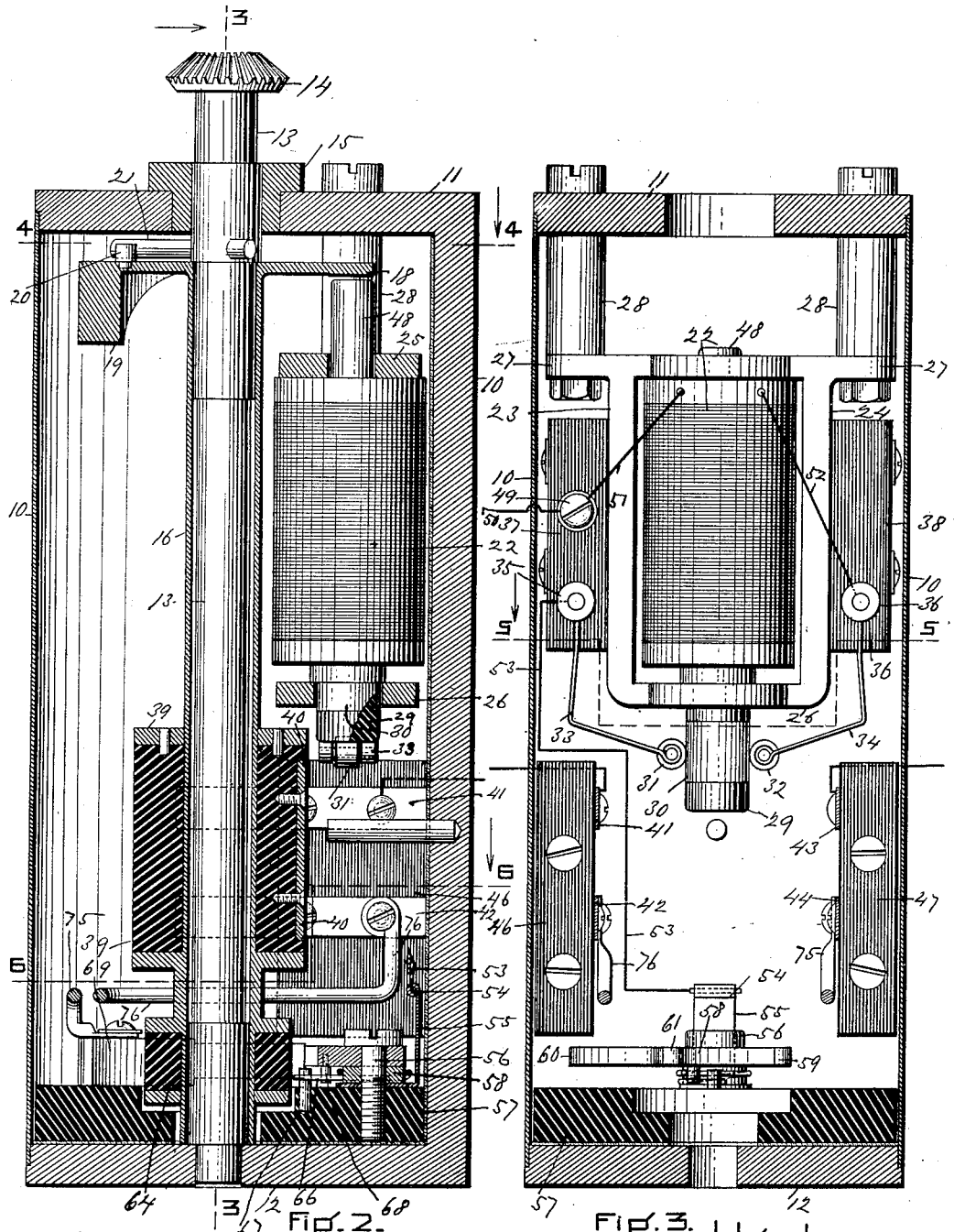

1,005,260.

Patented Oct. 10, 1911.

3 SHEETS—SHEET 3.

WITNESSES:
M. A. Atwood.
John Buckler,

INVENTOR:
Patrick F. McAvinney
By Henry W. Williams
Att'y.

COLUMBIA PLANOGRAPH CO., WASHINGTON, D. C.

UNITED STATES PATENT OFFICE.

PATRICK F. McAVINNEY, OF BOSTON, MASSACHUSETTS, ASSIGNOR TO COFFIN VALVE COMPANY, OF BOSTON, MASSACHUSETTS, A CORPORATION OF MAINE.

ELECTROMECHANICAL CONTROLLER.

1,005,260.        Specification of Letters Patent.     Patented Oct. 10, 1911.

Application filed December 21, 1910. Serial No. 598,660.

*To all whom it may concern:*

Be it known that I, PATRICK F. McAVINNEY, a citizen of the United States, residing at Boston, in the county of Suffolk and State of Massachusetts, have invented a new and useful Improvement in Electromechanical Controllers, of which the following is a specification.

This improved electro-mechanical controller is intended and adapted more particularly to be used in connection with devices for indicating the position of a motor-controlled gage-valve or sluice-gate on a suitable dial, my improved controller being connected with the operative mechanism of the gate, and the indicating device with which it is adapted to be electrically connected being sometimes at a considerable distance from the controller. I do not however limit myself to the use of this invention in connection with a gate-valve or any one particular indicator, as it may be employed in connection with devices for indicating the movements of valve-stems, or other mechanism for the purpose of indicating water-levels in reservoirs, ponds or tanks at considerable distances from the indicating device, and it is proposed to apply the present improved controller wherever it may be found to be of service.

The invention relates to a certain novel construction and arrangement of parts whereby by means of a certain lost-motion mechanism and its connecting parts the device is enabled to so control the electric connections between it and an indicator that the reverse movements of the valve-stem may be exactly and fully transmitted to the indicator so that they can be illustrated on the dial thereof; whereby the electric circuit to a solenoid is opened, preventing unnecessary and excessive waste of energy; whereby by means of a commutator, central bar and an arrangement of brushes the electric current is delivered to the wires connecting with solenoids on opposite sides of the indicator, for opening or closing the valve, through brushes on opposite sides of the controller; and whereby in other respects the controller is rendered efficient in its operation.

The nature of the invention is fully described below, and illustrated in the accompanying drawings, in which:—

Figure 4:
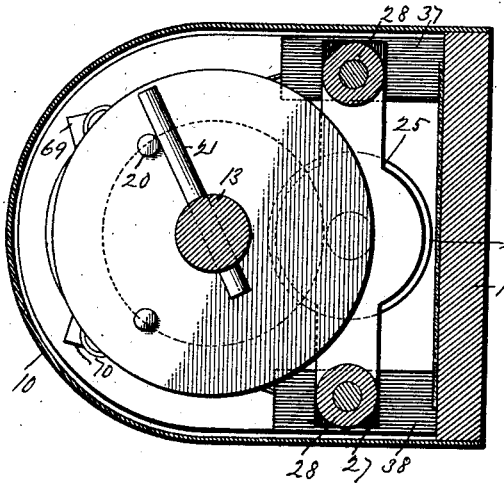
Figure 5:
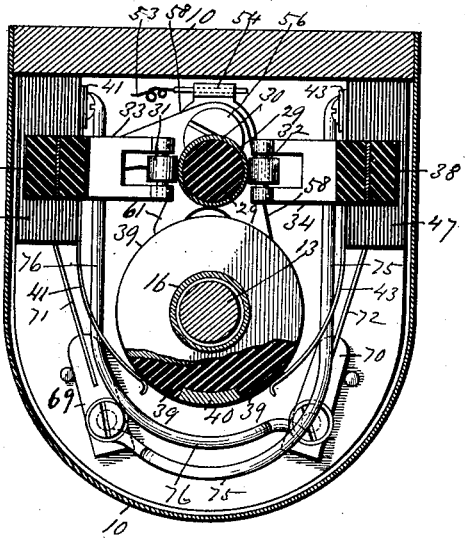
Figure 6:
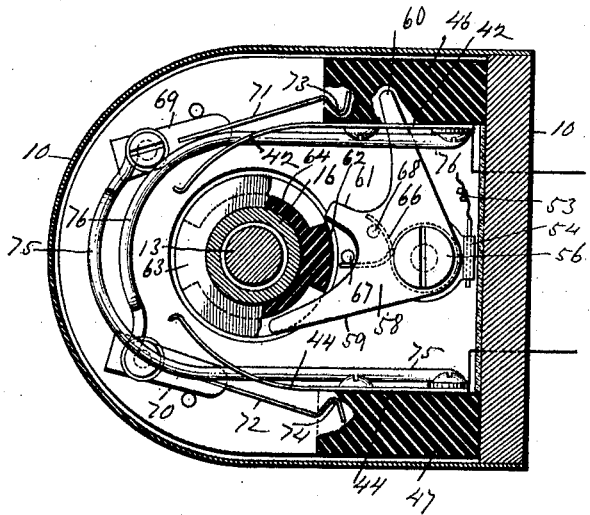

Figure 1 is a view in elevation of the mechanism of my improved controller, the sides of the casing being shown in section, and the controller being shown as electrically connected with an electromechanical indicator which is illustrated diagrammatically, such indicator being the subject of an application by me for Letters Patent of the United States executed of even date herewith. Fig. 2 is a vertical section taken on line 2—2, Fig. 1, enlarged. Fig. 3 is a vertical section taken on line 3—3, Fig. 2, the core of the magnet being down and the vertical solid shaft and tubular shaft with its cams and commutator being removed. Fig. 4 is a horizontal section taken on line 4—4, Fig. 2. Fig. 5 is a horizontal section taken on line 5—5, Fig. 3. Fig. 6 is a horizontal section taken on line 6—6, Fig. 2.

Similar numerals of reference indicate corresponding parts.

Reference-numeral 10 represents the upright portion of the case, and 11 and 12 the top and bottom respectively, said case containing the mechanism of the controller.

13 represents a vertical shaft having mounted on its upper end a bevel-gear 14 whereby mechanical connection is made with the stem of a valve or other rotary member, in this instance a gate-valve. This shaft 13 has its bearings in a suitable box 15 supported by the top plate 11, and in the lower plate 12. Between the upper and lower plates the shaft 13 extends through a hollow shaft 16, as illustrated in Figs. 2, 5 and 6. The lower end of this hollow shaft rests on the bottom 12 of the case, and the upper end is provided with a horizontal circular cam 18 of which 19 is the deepest or thickest portion. This cam is provided on its upper surface with a pin 20 extending into the space between the top of the cam and the top plate 11, and a horizontal engaging rod or arm 21 extends from the shaft 13 within said space, and is adapted when the shaft is rotated to strike said pin 20 and impart rotation to the cam thereby.

22 is a magnet centrally supported by a frame consisting of side bars 23 and 24, upper and lower plates 25 and 26 provided with openings for the core or plunger 48, and outward horizontal extensions 27 supported by rods or hangers 28 extending down from the upper plate 11. The lower end of the plunger which extends down through the magnet is made of insulating material 29 a portion of which is surrounded by a metallic ring 30. The vertical path of the plunger is central between rolls 31 and 32 supported by springs 33 and 34 whose upper ends are secured to binding-posts 35 and 36 on blocks of insulating material 37 and 38 respectively secured to the side bars 23 and 24. Rigid on the hollow shaft 16 is a commutator 39 made of hard rubber and a narrow vertical bar 40 on the opposite side of the shaft 16 from the deepest portion 19 of the cam 18, 19, said commutator being of such a length that as the cam 18, 19 revolves the bar makes contact with one or the other of the pairs of brushes 41, 42 and 43, 44. The pair of brushes 41, 42 is mounted on the block of insulation 46 at the left, and the pair of brushes 43, 44 is mounted on the block of insulation 47 at the right.

The electric wire 50 connects with the source of electricity and enters the controller at the binding-post 49 which is connected by the wire 51 with the magnet on one side, and the other side of the magnet is connected by the wire 52 with the binding-post 36. Extending from the binding-post 35 is a wire 53 which connects at 54 with an upwardly extending bar 55 connected with a stud or post 56 mounted in insulation 57. Swinging horizontally on this stud is a two-way switch 58 provided with the contact-wings 59, 60 and the central projection 61 (Fig. 6), said projection 61 being adapted to be engaged by one of the opposite projections 62, 63 on a fiber cam 64 rigid on the hollow shaft 16 and recessed between said projections 62, 63. Figs. 2 and 6. A suitable spring 66 in connection with vertical pegs 67, 68 (Figs. 2 and 6) operates to return the switch to a central position after engagement of either of the projections 62, 63 with the projection 61. Mounted on a block of insulation 57 supported by the lower plate or bottom 12 are metallic blocks 69 and 70 disposed on opposite sides of the cam 64, and from said blocks there extend horizontal contact-springs 71 and 72 (Figs. 5 and 6), said springs being bent inwardly at 73 and 74 whereby contact may be made with the outer ends of the wings 59 and 60 of the cam 58. The block 69 is connected by a thick wire 75 with the brush 44, and the block 70 is connected by a thick wire 76 with the brush 42.

A wire 77 extends from the upper left-hand brush 41 to an indicator 45, diagrammatically illustrated in Fig. 1 and thence to the right-hand solenoid 78 in said indicator, and a wire 79 extends from the upper right-hand brush 43 to the left-hand solenoid 80 in said indicator. The right-hand solenoid 78 is connected by a wire 81 with the negative wire 82, and the left-hand solenoid is connected by a wire 83 with said negative wire 82. Wires 84 and 85 connect the wires 77 and 79 respectively with metallic bars 86 and 87 which are adapted to be brought into contact with metallic blocks 88 and 89 respectively as the solenoids on the respective sides are energized, said blocks having metallic connection with the metallic block 90 with which the negative wire 82 is connected.

The bar 40 is located directly under the central portion of the highest or shallowest portion of the cam, and when the parts are in the position illustrated in either Fig. 1 or Fig. 5 is not in contact with either of the pairs of brushes 41, 42, and 43, 44. In practical operation, supposing the parts to be in the position illustrated in Fig. 5, in which the bar 40 on the commutator is in front and between the two pairs of brushes but in contact with neither pair:—Should the commutator be rotated toward the left by the movement of the gate-valve at a distance operating through its motor to rotate the gear 14 and shaft 13, and through the cam 19 the hollow shaft 16, the bar 40 will move over and connect the two brushes 41 and 42, with the result that an electric circuit will be established through the wire 50, binding-post 49, wire 51, magnet 22, wire 52, binding-post 36, spring 34, roll 32, ring 30, roll 31, spring 33, binding-post 35, wire 53, stud 56, switch 58, and, said switch having been moved by the action of the cam 64 on the projection 61 into contact with the spring 72, the current continues through said spring, the block 70 and the thick wire 76 to the lower brush 42, which is, as above stated, connected by the bar 40 with the upper brush 41, said upper brush being connected by the wire 77 with the right-hand solenoid in the indicator. Should the commutator be moved in the opposite direction whereby the bar 40 connects the two brushes 43 and 44, the circuit is established through the wire 50, binding-post 49, wire 51, magnet 22, wire 52, binding-post 36, spring 34, roll 32, ring 30, roll 31, spring 33, binding-post 35, wire 53, stud 56 to the switch 58 and its opposite end 60, the spring 71 (the cam 64 having rotated the switch in the opposite direction by engaging with the projection 61) blocks 69, thick wire 75 and lower right-hand brush 44, said brush being connected by the bar 40 with the brush 43 which is connected by the wire 79 with the left-hand solenoid in the indicator. Thus the energizing of the left or right solenoid in the indicator, the left or right movement of the bar 40, and the reverse movements of the valve are kept in step with one another and are practically simultaneous.

When the cam 18, 19 is moved from the position in which it is holding down the core 48 (which is the case in Fig. 3 although the cam is not in sight in that figure) toward the position illustrated in Fig. 2, the core is pulled up against the thin portion of the cam by the electric current, and when the cam is sufficiently rotated the lower end of the core allows the rolls 32 and 31 to swing under it, as illustrated in Fig. 2. The core or plunger will not rise until the deep portion 19 is rotated sufficiently to bring the bar 40 into electric contact with one of the pairs of brushes, and then the force of the magnet lifts it. It is when the cam has been rotated into such a position that the brushes on one side make contact with the bar 40 that a current is established with sufficient power to lift the core of the magnet against the power of gravity, thereby breaking the circuit which was established by the springs 33, 34, rolls 31, 32, and ring 30.

Wherever the commutator is stopped by the mechanism between it and the valve-stem, when the gate begins to reverse its movement the mechanism must make almost a complete rotation in order that the rod 21 may engage the pin 20 before again engaging the cam and again starting the commutator, thus preventing any possibility of the hand of the indicating device doubling back on the same point that it left or passed. Thus the indicator is kept in step with the movements of the valve-stem, reverse or otherwise, so that there is no movement of the indicator to correspond with a partial reverse movement when the direction of the travel of the valve is reversed. If on the mechanism coming to rest, the movement of the gate is reversed, the shaft 13 must rotate practically a full revolution without moving the cam which is loose on it and which presses the plunger down allowing the circuit to remain open between the points 31 and 32, while the bar 40 passes from one pair of brushes to the other. When the bar 40 has crossed the space between the two sets of brushes, say toward the right, and has passed beyond contact with the right set of brushes the circuit must be open between the brushes and also between the rolls 31, 32, and the reversing of the cam and return of the bar back across the space between the brushes does not make a circuit until the pin on the cam reaches the rod 21.

Having thus fully described my invention, what I claim, and desire to secure by Letters Patent is:—

1. In an electro-mechanical controller, a shaft provided with mechanism whereby it can be mechanically connected with a valve-stem or other appliance capable of reverse movements, an electro-magnet adapted to be placed in electrical circuit with either of a pair of solenoids making a part of the mechanism of a device for indicating such reverse movements, a commutator provided with a metallic bar adapted to make or break a circuit with either of said solenoids, a shaft rigid with the commutator, and mechanism comprising a lost motion device intermediate of the two said shafts whereby when the movement of said valve-stem or other appliance is reversed reverse movement is not communicated to the shaft which is rigid with the commutator or to the metallic bar on said commutator until the shaft which is connected with the valve-stem or other appliance has made almost a complete revolution.

2. In an electro-mechanical controller, a shaft provided with mechanism whereby it can be mechanically connected with a valve-stem or other appliance capable of reverse movements, an electro-magnet, a commutator provided with a metallic bar, a shaft rigid with the commutator, electrical connections extending from the magnet and adapted to be continued to a device for indicating such reverse movements and comprising a pair of solenoids, mechanism for transmitting rotation from the shaft connected with the valve-stem or other appliance to the shaft which is connected to the commutator thereby enabling said bar to make or break a circuit with either of said solenoids, and a lost motion mechanism whereby the reverse movement is not communicated from the shaft connected with the valve-stem or other appliance to the shaft connected with the commutator until the last-named shaft has made almost a complete revolution.

3. In an electro-mechanical controller, a shaft provided with mechanism whereby it can be connected with a valve-stem or other appliance capable of reverse movements, an electro-magnet, a commutator provided with a metallic bar, a shaft rigid with the commutator, electrical connections extending from the magnet and adapted to be continued to a device for indicating such reverse movements and comprising a pair of solenoids, mechanism for transmitting rotation from the shaft connected with the valve-stem or other appliance to the shaft which is connected to the commutator thereby enabling said bar to make or break a circuit with either of said solenoids, and a lost motion mechanism whereby the reverse movement is not communicated from the shaft connected with the valve-stem or other appliance to the shaft connected with the commutator until the last-named shaft has made a partial revolution.

4. In an electro-mechanical controller, an electro-magnet adapted to be placed in electrical circuit with either of a pair of solenoids in an indicating device, a commutator provided with a metallic bar adapted to complete or break said circuit with either of said solenoids, mechanism adapted to be connected with a valve-stem or other appliance outside the controller and capable of reverse movements, mechanism for moving the metallic bar on the commutator into or out of circuit with either of said solenoids in the indicating mechanism, and mechanism intermediate of the mechanism connected with the valve-stem or other appliance and the mechanism connected with the commutator whereby the movements of said valve-stem or other appliance are communicated to the commutator but a reverse movement is not thus communicated until the mechanism connected with the valve-stem or other appliance has completed a certain amount of movement.

5. In an electro-mechanical controller, an electro-magnet adapted to be placed in electrical circuit with an indicating device, mechanism adapted to be connected with a valve-stem or other appliance outside the controller, mechanism for making or breaking the said electrical circuit, and mechanism including a lost-motion device intermediate of the mechanism connected with the valve-stem or other appliance and the mechanism for making or breaking the electrical circuit whereby the last-named mechanism is put into operation after an appreciable length of time subsequent to the reverse movements of the mechanism connected with the valve-stem or other appliance.

6. In an electro-mechanical controller, a shaft provided with mechanism whereby it can be mechanically connected with a valve-stem or other appliance capable of reverse movements, an electro-magnet adapted to be placed in electrical circuit with either of a pair of solenoids making a part of the mechanism of a device for indicating such reverse movements, a commutator provided with a metallic bar adapted to make or break a circuit with either of said solenoids, a shaft rigid with the commutator, a cam rigid on the commutator-shaft, and mechanism actuated by the shaft which is connected with the valve-stem or other appliance whereby the reverse revolution of the last-named shaft is communicated to the commutator-shaft after the shaft connected with the valve-stem or other appliance has made a portion of another revolution.

7. In an electro-mechanical controller, a shaft provided with mechanism whereby it can be mechanically connected to a valve-stem or other appliance capable of reverse movements, a tubular shaft surrounding the first-named shaft, a commutator rigid on the tubular shaft and provided with a metallic bar, a horizontally disposed cam rigid on said tubular shaft above the commutator with the shallowest portion of the cam directly over the said metallic bar, an electro-magnet the stem of which is adapted to be up in engagement with the under side of the cam, and suitable brushes bearing on the commutator in the line of the path of the metallic bar, whereby an electrical circuit is adapted to be established through the magnet, some of the brushes and the metallic bar to a suitable indicator and the movements of the shaft connected with the valve-stem or other appliance transmitted to the indicator the reverse movements thereof however not being transmitted until the cam has made almost a complete revolution.

8. In an electro-mechanical controller, a shaft provided with mechanism whereby it can be mechanically connected to a valve-stem or other appliance capable of reverse movements, a tubular shaft surrounding the first-named shaft, a commutator rigid on the tubular shaft and provided with a metallic bar, a horizontally disposed cam rigid on said tubular shaft above the commutator with the shallowest portion of the cam directly over the said metallic bar, an electro-magnet the stem of which is adapted to be up in engagement with the under side of the cam, two pairs of brushes bearing on the commutator in the line of the path of the metallic bar but insulated from said bar when it is central between the two pairs and the shallowest portion of the cam is also central and directly in front and at its farthest point from the magnet, a cam rigid on the tubular shaft below the commutator, an electrical switch actuated by the cam, and electrical connections between the opposite ends of the switch and the said opposite pairs of brushes, whereby an electrical circuit may be established from the magnet through either of the pairs of brushes and the movements in opposite directions of the shaft connected to the valve-stem transmitted to the indicator.

In testimony whereof I have signed my name to this specification in the presence of two subscribing witnesses.

PATRICK F. McAVINNEY.

Witnesses:
HENRY W. WILLIAMS,
M. A. ATWOOD.

Copies of this patent may be obtained for five cents each, by addressing the "Commissioner of Patents, Washington, D. C."